United States Patent [19]

Popadenec et al.

[11] Patent Number: 6,103,310

[45] Date of Patent: Aug. 15, 2000

[54] METHOD TO PREVENT THE STICKING OF METALLIC SHEETS DURING A THERMAL TREATMENT

[75] Inventors: Alain Popadenec, Marspich; Cécile Legal, Thionville, both of France

[73] Assignee: Sollac, Puteaux, France

[21] Appl. No.: 09/256,993

[22] Filed: Feb. 25, 1999

[30] Foreign Application Priority Data

Feb. 25, 1998 [FR] France .................................. 98 02266

[51] Int. Cl.⁷ ...................................... B05D 3/02
[52] U.S. Cl. ...................... 427/387; 427/156; 427/388.1; 427/388.4; 148/537; 148/601
[58] Field of Search .................................. 427/327, 387, 427/388.1, 388.4, 156; 148/113, 527, 529, 530, 537, 601

[56] References Cited

U.S. PATENT DOCUMENTS

| | | | |
|---|---|---|---|
| 4,463,114 | 7/1984 | Balchunis et al. | 524/157 |
| 4,537,792 | 8/1985 | Kitayama et al. | 427/13 |
| 5,292,549 | 3/1994 | Van Ooij et al. | 427/156 |
| 5,478,410 | 12/1995 | Ushigami et al. | 148/111 |

OTHER PUBLICATIONS

Watanabe Hajime; "Coating Agent for Working by Laser Light"; Patent Abstracts of Japan; vol. 14, No. 80; Feb. 15, 1990 & Japan 01298113, Dec. 1, 1989.

Omura Hideo; "Nickel Plated Steel Sheet Applied with Adhesion Preventing Treatment at the Time of Annealing and its Production"; Patent Abstracts of Japan; vol. 97, No. 04; Apr. 30, 1997; & Japan 08333689, Dec. 17, 1996.

Kanbara Susumu; "Method for Preventing Adhesion of Wire Rod During Annealing"; Patent Abstracts of Japan; vol. 16, No. 443; Sep. 16, 1992; & Japan 04154973; May 27, 1992.

Kurosaki Kiyoshi; "Preventing Method for Adhesion Heat Treatment of Metal"; Patent Abstracts of Japan; vol. 04, No. 129; Sep. 10, 1980; & Japan 55082726; Jun. 21, 1980.

*Primary Examiner*—Timothy Meeks
*Assistant Examiner*—Jennifer Calcagni
*Attorney, Agent, or Firm*—Oblon, Spivak, McClelland, Maier & Neustadt, P.C.

[57] ABSTRACT

Method comprising a thermal treatment step proper during which said sheets are in contact with a part of their surface (that is they are, for example, coiled or in tight packets) and a step of preliminary treatment of these surfaces by means of an aqueous solution or a water-alcohol solution into which an organic product of the silane type has been introduced.

This treatment makes it possible to prevent the sticking of the sheets; it is particularly effective and it does not require any preliminary activation of the surface.

19 Claims, No Drawings

METHOD TO PREVENT THE STICKING OF METALLIC SHEETS DURING A THERMAL TREATMENT

BACKGROUND OF THE INVENTION

1. Field of the Invention

The invention concerns a method of thermal treatment of metallic sheets comprising a thermal treatment step during which said sheets are in contact with each other over at least a part of their surfaces, and a step of preliminary treatment of said surfaces, the purpose of which is to prevent the sticking of said sheets at the level of said contacting surfaces.

2. Background of the Invention

When a thermal annealing treatment of steel sheets in coils or in tight sheets (e.g. stacked without separation wedges) is carried out, the different windings of the coil or the folded sheets often risk sticking or adhering to each other; this sticking or adhering is caused by the diffusion of the metal at the level of the contacts between the surfaces of the sheets. This risk of sticking appears notably in the case of alloy annealing.

The term "alloy annealing" is defined here as a thermal treatment for steel sheets coated with a metallic deposit intended to cause alloying between the iron of the substrate and the metal of the coating; the coating metal is, for example, zinc applied to the immersed material or electroplated nickel.

This type of annealing is generally carried out at a high temperature, which increases the risk of sticking: in the range 450–650° C. for the alloying of a nickel coating, 250–400° C. for the alloying of a zinc coating.

The document JP 01 298113 (1989) describes a treatment of metallic surface or polymer, prior to a treatment of cutting, welding or hardening, by laser application of the surface; this preliminary treatment consists in applying a coating agent comprising a powder with high conductivity, which is heat resistant, a tackifier heat-resistant agent chosen from acids, esters or stearate salts, organic polysilanes or silicone oils, polyethylenes or polybutenes and their derivatives, diluted and dispersed in an organic solvent with low boiling point, such as ethanol or $CCl_4$.

Nothing in this document indicates that this preliminary treatment could limit the risks of sticking, since one of the intentions pursued here is, to the contrary, to make welding possible.

To limit the risk of sticking, it is known to carry out, prior to the thermal treatment, a treatment of the surface of the sheets, as described in the following documents:

JP 08 333689 A For the preparation for the thermal treatment of a nickel coated sheet, 0.1–2.5 mg/m² of silica are first applied by immersing the sheet in a solution of sodium orthosilicate;

JP 04 154973 For the preparation for the thermal treatment of steel wires, the wire is descaled by stripping, and then it is immersed in a solution based on silica and sodium hydroxide, and heated to a temperature of 70–90° C. so as to form a deposit with a surface density of more than 3 g/m²;

JP 55 82726 To avoid the sticking between windings during the basic annealing of steel types called "low carbon" steels, a solution of silicate or colloidal suspension of silica is first atomized on the sheets; the procedure is carried out in a solvent such as methanol.

The drawback of these preliminary surface treatments intended to prevent sticking is that they must be carried out on clean surfaces, and even activated surfaces, which requires degreasing and even stripping of this surface before the application of the "antistick" deposit.

OBJECTS OF THE INVENTION

One object of the invention is to avoid this drawback and to provide a surface treatment which can be applied directly to the metallic sheets, without prior degreasing.

SUMMARY OF THE INVENTION

For this purpose, the invention relates to a method of the above-mentioned type, characterized in that the preliminary treatment comprises application onto the surface or surfaces of one or more metallic objects such as sheets of an aqueous solution or a water-alcohol solution into which at least one organic product of the silane type has been introduced.

According to the invention, the solution for surface treatment is preferably not truly a solution of silanes, but a solution containing products of the hydrolysis of silanes.

The invention can also present one or more of the following characteristics:

application is carried out so as to obtain, on said surfaces, a deposit of polysiloxane having a surface density less than or equal to 20 mg of silicon equivalent per m² and per face, and the quantity of said silane introduced into the treatment solution is 1–15 vol %.

DETAILED DESCRIPTION OF THE INVENTION

The invention will be better understood after reading the following description given as a nonlimiting example.

Thus, the overall task to be accomplished is the thermal treatment of metallic objects, such as metallic sheets, preferably steel sheets, for example in an enclosure for thermal treatment.

To introduce these sheets into the treatment enclosure, they are in contact with themselves or each other, for example wound into coils or stacked (if they are cut into sheets).

To prevent the risks of sticking, a treatment will therefore be applied to the surfaces of these sheets, preferably without prior degreasing.

These objects (sheets) to be treated can originate directly from an operation of lamination or an operation of coating (for example, with a layer based on nickel or zinc); they can thus comprise traces of grease, and the surface is not "activated"; an example of a "activated" surface is a surface which comes out of a stripping operation.

As the solution for surface treatment which is suitable for forming a deposit which inhibits the sticking on the surface, an aqueous or water-alcohol solution or emulsion according to the invention is used, into which at least one organic product of the silane type has been introduced.

This silane can be chosen from organosilanes having the general formula $R_m—Si—(X)_{(4-m)}$:

in which the radicals X, which may be identical or different, are chosen from the group comprising the alkoxy, acyloxy, alkylcarbonyl or alkoxycarbonyl, alcohol radicals, or halogen;

in which the radicals R, which may be identical or different, are chosen from the group comprising the alkyl, alkenyl, alkynyl, aryl, arylalkyl, alkylaryl, arylalkenyl, alkenylaryl, arylalkynyl or alkylnylaryl carbon radicals, which can be interrupted by O, S or N atoms, and which can be substituted by one or more radicals chosen from the group comprising halogen amino, amide, aldehyde, keto, alkylcarbonyl, carboxy, alkoxycarbonyl, mercapto, cyano, hydroxy, alkoxy, alkoxycarbonyl radicals, sulfonic acid, phosphoric acid, acryloxy, methacryloxy, epoxy, vinyl, ureido, glylcidoxy, $NH_2$,—CH=CH—, $CH_2$=CH—, $CH_2$=($CH_3$)(COO—), $CH_2$(—O—)CH—$CH_2$O—, HS—, Cl;

in which m is equal to 0, 1, 2 or 3;
preferably, m=1;

If m=1, all radicals X can be identical and denote $OCH_2CH_3$ or $OCH_3$, and the single radical R can denote: $NH_2$—$(CH_2)_3$— or $CH_3$—NH—$(CH_2—)_3$—; in that case, one uses, for example, γ-aminopropyltriethoxysilane.

The number of carbon atoms of said carbon chains most preferably is up to 17; thus, one can use, for example, octyltriethoxysilane (8 carbon atoms in the chain) in an emulsion in the water.

If m=0, one may use, for example, tetraethoxysilane, sometimes called tetraethyl silicate, having the general formula Si—$(O—C_2H_5)_4$; this molecule has the peculiarity of polymerizing to produce a solution of ethyl polysilicate, and also a hydrolysate of silicic acid ester.

This silane can also be chosen from polysilanes or silicic acid esters having the general formula $(R'O)_3Si$—O—[Si$(OR'')_2]_k$—O—$Si(OR''')_3$, in which R', R'' and R'''are alkyl generally $C_{1-5}$ such as methyl, ethyl or propyl.

As the silane, one can thus use γ-aminopropyltriethoxysilane, tetraethoxysilane, or octyltriethoxysilane.

If the silane used is not sufficiently water-soluble, a water-alcohol solution, or an emulsion is used.

When it is introduced into the water-alcohol solution, the silane hydrolyzes, for example, according to the reaction:
$R_m$—$SiX_{(4-m)}$+$H_2O$→$R_m$—$Si(OH)_{(4-m)}$+mR'OH.

The quantity of silane introduced into the aqueous solution or emulsion for treatment is generally 1–15 vol % with respect to the solution or emulsion.

In a manner which is known in itself, the solution for the surface treatment can contain other additives, such as surfactants, to facilitate application, for example, bactericidal agents for stability during storage.

One then applies to the surface of the sheets the aqueous or water-alcohol solution or emulsion which contains the products of hydrolysis of the silanes introduced, in any known manner.

Preferably, the concentration of silane and the application procedure for the treatment solution are adapted in a manner which in itself is known to form on the surface of the sheets a deposit of the polysiloxane type presenting a surface density of 0.1–20 mg/m²/face, by weight of silicon equivalent, this surface density being measured after drying of the deposit.

The drawback of a deposit having a surface density less than 0.1 mg/m²/face of silicon equivalent is that it no longer presents sufficient effectiveness in preventing the sticking.

The drawback of a deposit having a surface density of more than 20 mg/m²/face in silicon equivalent is, besides the cost, the fact that causes difficulties pertaining to cold drawing and phosphatization.

Concerning the surface of the metallic substrate being treated with hydroxide in the beginning, it is thought that the process of deposition takes place according to a reaction of the type:

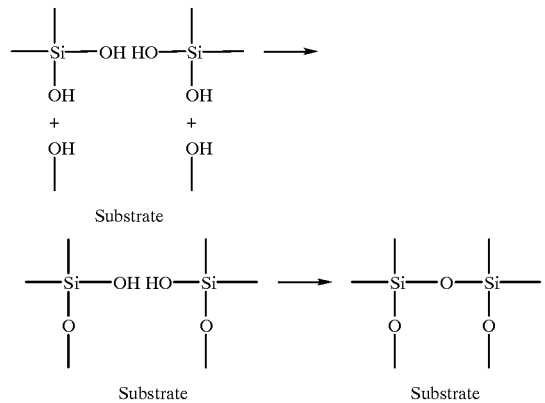

After the application of the aqueous or water-alcohol solution or emulsion, the sheet is dried; this drying step is important to achieve a sufficient crosslinking of the polysiloxanes which form the basis of the deposit; the drying step can correspond to the beginning of the thermal treatment.

After the application of the treatment solution, the sheet is ready to be subjected to the thermal treatment.

The sheets are thus placed in coils (coiling) or stacks, and the thermal treatment is applied in the conventional manner.

After the thermal treatment, a very appreciable decrease in risks of sticking of the windings of the coil or the sheets of the stack is observed compared to the case where no preliminary surface treatment is carried out.

This result is obtained:
although no degreasing of the surface is carried out before the application of the surface treatment solution;
and even for deposits having a low surface density, less than 20 mg/m²/face of silicon equivalent.

Another advantage of the invention is that one can use a simple and economic application method to carry out the treatment; indeed the deposition rate is much higher than for the surface treatments described in the prior art, and consequently the continuous line of surface treatment can be shortened, and it is not useful to carry out the treatment under electrical polarization.

Roll coating or coating by atomization nozzles are application methods which are considered "simple" and they can be used for the implementation of the invention.

Example

The following example illustrates the invention:
On a strip of steel sheet which has been cold laminated and which is coated with a 2.5-μm layer of electroplated nickel, an aqueous solution is applied, which was prepared by the introduction of γ-aminopropyltriethoxysilane into water.

The concentration of silane and the conditions of application are adapted to obtain a deposit, expressed by weight in silicon equivalent, of:

Test 1: solution with 5 vol % of silane, a deposition of 7 mg/m²/face.

Test 2: solution of 10 vol % of silane, deposition of 13 mg/m²/face.

Test 0 (zero) corresponds to the absence of surface treatment.

After the application, a drying step is carried out for 10 sec at 80° C.; one can also obtain a treated dry sheet, by carrying out the application on a sheet which has been heated to approximately 150° C.

The sheets corresponding to the different Tests are then stacked (tight stacking) and subjected to a thermal treatment at 700° C. for 15 h, in a nitrogen atmosphere containing approximately 3% hydrogen.

After the thermal treatment, the sticking of the sheets is then evaluated as follows:

- two lamellae of sheets that are stuck to each other are collected: width 2.5 cm, length 18.5 cm;
- at one end, the lamellae are separated over a length of 2.5 cm, and the separated ends are folded back on each side of the general plane of the sticking sheets, perpendicular to the plane;
- with the help of the two "folded back parts" engaged in the jaw of a conventional traction machine, the two lamellae of sheets are completely separated (the total displacement to be achieved is thus 32 cm) while measuring the "peeling" force to be applied to obtain the separation; the peeling force is thus exerted perpendicularly to the general plane of the sticking sheets.

The mean peeling force is calculated, and it is expressed with respect to the width of the lamellae.

The following results are obtained:

Test 0 (reference): 32 N/cm.

Test 1: 19 N/cm.

Test 2: 10 N/cm.

Thus, one observes a very considerable decrease in the problems of sticking owing to the preliminary surface treatment according to the invention; the sticking decreases proportionally to the thickness of the deposit applied from the aqueous solution; this advantage is obtained without any prior degreasing of the sheet.

This preliminary treatment is also effective when used on oiled sheets.

French patent application 98 02 266 is incorporated herein by reference.

What is claimed is:

1. In a process of thermally treating metallic sheets which includes the steps of stacking said sheets such that the surfaces thereof are in contact and heating the stacked sheets at an elevated temperature, the improvement which comprises applying to the surface of at least one of said sheets prior to stacking, an aqueous composition consisting essentially of an organosilane in an amount sufficient to prevent the surfaces from adhering to each other during the thermal treatment.

2. The method according to claim 1, wherein said preliminary treatment provides a polysiloxane deposit whose surface density is less than or equal to 20 mg of silicon equivalent per m$^2$ and per face.

3. The method according to claim 1, wherein said organosilane is present in said composition 1–15 vol %.

4. The method according to claim 1, wherein said organosilane has the general formula $R_m$—Si—$(X)_{(4-m)}$:

in which the radicals X, which may be identical or different, are selected from the group consisting of alkoxy, acyloxy, alkylcarbonyl or alkoxycarbonyl, alcohol and halogen radicals;

in which the radicals R, which may be identical or different, are selected from the group consisting of alkyl, alkenyl, alkynyl, aryl, arylalkyl, alkylaryl, arylalkenyl, alkenylaryl, arylalkynyl or alkylnylaryl carbon radicals, which can be interrupted by O, S or N atoms, and which can be substituted by one or more radicals selected from the group consisting of halogen, amino, amide, aldehyde, keto, alkylcarbonyl, carboxy, alkoxycarbonyl, mercapto, cyano, hydroxy, alkoxy, alkoxycarbonyl radicals, sulfonic acid, phosphoric acid, acryloxy, methacryloxy, epoxy, vinyl, ureido, and glylcidoxy, where m=0, 1, 2 or 3.

5. The method according to claim 4, wherein:

m=1 all the groups X are identical and denote —OCH$_2$CH$_3$ or —OCH$_3$,

R denotes NH$_2$—(CH$_2$)$_3$— or CH$_3$—NH—(CH$_2$—)$_3$—.

6. The method according to claim 4, wherein:

m=1, the number of carbon atoms in R and each X group is less than or equal to 17.

7. The method according to claim 1, wherein said organosilane is chosen from the polysilanes or the silicic acid esters having the general formula (R'O)$_3$Si—O—[Si(OR")$_2$]$_k$—O—Si(OR''')$_3$, where R', R" and R"are alkyl groups.

8. The method according to claim 1, wherein said sheets are steel sheets.

9. The method according to claim 2, wherein said sheets are steel sheets.

10. The method according to claim 3, wherein said sheets are steel sheets.

11. The method according to claim 4, wherein said sheets are steel sheets.

12. The method according to claim 5, wherein said sheets are steel sheets.

13. The method according to claim 6, wherein said sheets are steel sheets.

14. The method according to claim 7, wherein said sheets are steel sheets.

15. The sheets obtained by the method of claim 1.

16. The sheets obtained by the method of claim 8.

17. A process according to claim 1, wherein the elevated temperature ranges from 250° C. to 650° C.

18. A process according to claim 1, wherein said metallic sheets are in the form of coils.

19. A process according to claim 1, wherein the metallic sheets comprise steel coated with an alloying metal, and the aqueous solution prevents reaction between adjacent steel sheets.

* * * * *